US008413772B2

(12) United States Patent
Wereley et al.

(10) Patent No.: US 8,413,772 B2
(45) Date of Patent: Apr. 9, 2013

(54) MAGNETORHEOLOGICAL FLUID ELASTIC LAG DAMPER FOR HELICOPTER ROTORS

(75) Inventors: Norman Mark Wereley, Potomac, MD (US); Wei Hu, Rockville, MD (US); Curt Steven Kothera, Crofton, MD (US); Peter Che-Hung Chen, Clarksville, MD (US); Grum Tamrat Ngatu, Alexandria, VA (US)

(73) Assignees: Techno-Sciences, Inc., Calverton, MD (US); The University of Maryland at College Park, College Park, MD (US)

( * ) Notice: Subject to any disclaimer, the term of this patent is extended or adjusted under 35 U.S.C. 154(b) by 886 days.

(21) Appl. No.: 12/378,275

(22) Filed: Feb. 12, 2009

(65) Prior Publication Data

US 2009/0218443 A1    Sep. 3, 2009

Related U.S. Application Data

(60) Provisional application No. 61/065,444, filed on Feb. 12, 2008.

(51) Int. Cl.
*F16F 9/53* (2006.01)
(52) U.S. Cl. ................... 188/267.2; 267/140.14
(58) Field of Classification Search .......... 188/266, 188/267, 267.1, 267.2; 267/140.14, 140.15, 267/140.3
See application file for complete search history.

(56) References Cited

U.S. PATENT DOCUMENTS

| | | | |
|---|---|---|---|
| 5,277,281 A | 1/1994 | Carlson et al. | |
| 5,398,917 A * | 3/1995 | Carlson et al. | 267/140.14 |
| 5,501,434 A | 3/1996 | McGuire | |
| 6,279,700 B1 | 8/2001 | Lisenker et al. | |
| 6,311,810 B1 | 11/2001 | Hopkins et al. | |
| 6,694,856 B1 | 2/2004 | Chen et al. | |
| 6,953,108 B2 | 10/2005 | Anderfaas et al. | |

OTHER PUBLICATIONS

F.F. Felker et al., *Nonlinear behavior of an elastomeric lag damper undergoing dual-frequency motion and its effect on rotor dynamics*, Journal of the American Helicopter Society, 1987, pp. 45-53.
Kamath et al, *Characterization of magnetorheological helicopter lag dampers*, Journal of the American Helicopter Society, Jul. 1999, 44, 3.
Wereley et al., *Hysteresis modeling of semi-active magnetorheological helicopter dampers*, Journal of Intelligent Material Systems and Structures, 1999, vol. 10, No. 8, 624-633.
Kamath et al., *Analysis and testing of a model-scale magnetorheological fluid helicopter lag mode damper*, 1997, Proceedings of the 53rd Annual Forum, American Helicopter Society, Alexandria.

(Continued)

*Primary Examiner* — Melanie Torres Williams
(74) *Attorney, Agent, or Firm* — Ober, Kaler, Grimes & Shriver; Royal W. Craig

(57) ABSTRACT

A MagnetoRheological Fluid Elastic (MRFE) lag damper system for adaptive lead-lag damping of helicopter main rotors. Embodiments include snubber dampers especially for hingeless helicopter rotors, and concentric bearing dampers. The snubber lag dampers include a flexible snubber body defining a cavity, a flexible or rigid interior (e.g., center) wall subdividing the cavity, and a flow valve in the interior wall or external to the cavity. The flexible snubber body may comprise elastomeric materials and metal rings stacked together to create a sealed MR fluid cavity. The shear deformation of the snubber body induces MR fluid flow through the valve, controlled by a magnetic field in the valve. An MRFE concentric bearing damper is also disclosed, comprising a pair of concentric tubes with elastomeric material injected and cured in an annular gap between the two tubes, and an MR fluid reservoir with piston-mounted MR valve housed inside the innermost tube.

17 Claims, 10 Drawing Sheets

OTHER PUBLICATIONS

Marathe et al., *Feedback linearization control of magnetorheological fluid damper based systems with model uncertainty*, Institute of Physics Publishing, Smart Materials and Structures 13, 2004, 1006-1016.

Hu et al., *Magnetorheological fluid and elastomeric lag damper for helicopter stability augmentation*, International Journal of Modern Physics, 2005, Part B, vol. 19, No. 7-9, pp. 1471-1477.

* cited by examiner

MAGNETORHEOLOGICAL FLUID ELASTIC LAG DAMPER FOR HELICOPTER ROTORS

CROSS-REFERENCE TO RELATED APPLICATION(S)

The present application derives priority from U.S. provisional application Ser. No. 61/065,444 filed Feb. 12, 2008.

BACKGROUND OF THE INVENTION (1) Field of the Invention

The present invention relates to helicopter rotor lead-lag dampers and, more particularly, to lag dampers for damping helicopter rotors in lag mode by employing a combination of controllable magnetorheological (MR) fluids and reliable viscoelastic materials.

(2) Description of Prior Art

Most modern helicopter main rotors are equipped with lead-lag dampers to alleviate aeromechanical instabilities, such as ground resonance resulting from the interaction of lightly damped regressing rotor blade lag modes with support modes. Conventional lag dampers use passive materials, such as elastomers, to dissipate energy, but their damping and stiffness levels diminish markedly as amplitude of damper motion increases. In forward flight conditions, the blade lead-lag motion in helicopters occurs at two frequencies of the lead-lag frequency and 1/rev frequency, and the large motions at 1/rev will reduce the damping at lag/rev substantially, thus, causing undesirable limit cycle oscillations. F. F. Felker, B. H. Lau, S. McLaughlin, and W. Johnson, Nonlinear behavior of an elastomeric lag damper undergoing dual-frequency motion and its effect on rotor dynamics, J. American Helicopter Society (1987) pp. 45-53. Moreover, damping augmentation is only required over certain flight regimes where there is a potential for instabilities to occur, and a passive damper providing a fixed damping may produce unfavorably large periodic loads on the rotor hub. Additionally, the mechanical properties of different dampers should be matched to minimize the impact of varying damper mechanical properties on rotor tracking conditions. "Characterization of Magnetorheological Helicopter Lag Dampers" by Kamath, Gopalakrishna, University of Maryland, Wereley, N.; Jolly, M., Journal of The American Helicopter Society (1999) July 44, 3.

Clearly, an adaptable damper, which could produce the desired amount of damping without a corresponding increase in periodic loads and could be adjusted to compensate for damping and other performance losses at extreme environmental conditions, would be of considerable value.

Magnetorheological (MR) fluid as a smart material has been proposed as the working fluid in helicopter rotor lag dampers. Hysteresis Modeling of Semi-Active Magnetorheological Helicopter Dampers, Wereley et al. Journal of Intelligent Material Systems and Structures, Vol. 10, No. 8, 624-633 (1999). Since the yield stress of the fluid demonstrates a substantial variation with the application of a magnetic field, many MR dampers for shock and vibration isolation mounts have been disclosed such that the damping level can be controlled in feedback by applying a magnetic field. See, for example, U.S. Pat. No. 5,277,281 to J. D. Carlson et al., U.S. Pat. No. 6,279,700 to H. Lisenkser et al., U.S. Pat. No. 6,311,810 to P. N. Hopkins et al., U.S. Pat. No. 6,694,856 to P. C. Chen and N. M. Wereley, and U.S. Pat. No. 6,953,108 to E. N. Ederfass and B. Banks. Much work has been done to evaluate the capabilities of MR lag dampers. Kamath et al. demonstrated the feasibility of using MR dampers for lag mode damping applications. Kamath, G. M., Wereley, N. M., and Jolly, M. R., "Analysis and testing of a model-scale magnetorheological fluid helicopter lag mode damper," Proceedings of the 53rd Annual Forum, American Helicopter Society, Alexandria, 1997. Lag damping control using MR dampers is also under consideration. It has been shown that the ground resonance instability and damping load in forward flight can be alleviated with semi-active feedback control using feedback linearization strategies. Marathe, S., Wang, K. W., and Gandhi, F., "The Effect of Model Uncertainty on Magnetorheological Fluid Damper Based Systems Under Feedback Linearization Control," Proceedings of the ASME International Mechanical Engineering Congress & Exposition (Adaptive Structures and Material Systems), Anaheim, Calif., November 1998, AD-Vol. 57, pp. 129-140. The controllable damping provided significant flexibility in damping augmentation strategies. However, prior efforts are based on scaled or theoretical models of MR dampers.

The combination of elastomeric materials and MR fluids in a lag damper has been considered as a rational choice. First, elastomeric materials can contribute stiffness to the lead-lag mode of blades. Second, an elastomer itself can act as a flexible sealant material to eliminate the possibility of leakage. Third, the kinematic complexity in modern bearingless or hingeless helicopter main rotors requires a flexible damper body such that damper chamber is usually made from a laminated stack of alternating elastomeric-metallic rings, and the flexible damper body provides a housing for damping fluids or MR fluids (Refs. Kamath, Panda). The feasibility of a combination of MR fluids and elastomeric materials was studied by an emulation of a magnetorheological fluid and elastic (MRFE) composite damper. W. Hu and N. M. Wereley, 2005, "Magnetorheological Fluid and Elastomeric Lag Damper for Helicopter Stability Augmentation." International Journal of Modern Physics Part B. Vol. 19, No. 7-9, pp. 1471-1477. This experimental feasibility study validated a considerable damping control range provided by a flow mode MR valve in the MRFE damper. While damping is provided by the combination of the elastomer and MR fluid, this preliminary MRFE damper can actively augment damping over critical frequency ranges and enhance the stability of helicopter rotors. Although the stiffness in the elastomer is still available as a design parameter, the MR and elastomeric damping elements of the MRFE damper can augment each other. In addition, the passive damping in both the elastomer and MR damping elements provides a fail-safe damping in the event that control of the field-dependent MR damping is lost.

There is scarce published research on development of MRFE dampers. Description for a hybrid fluid and elastomeric damper can be found in U.S. Pat. No. 5,501,434 to D. P. McGuire. A scheme for combining an MR valve with elastomers was also disclosed in U.S. Pat. No. 5,277,281 to J. D. Carlson et al.

The present inventors propose a snubber type and a concentric bearing type lead-lag damper, both types of dampers incorporating an MR valve into a damper body. As disclosed below in further detail, the snubber type MRFE damper comprises a flexible damper body that can be made from a laminated stack of alternating elastomeric-metallic rings, a center or interior wall dividing the body into two fluid chambers, and an MR valve housed in the center or interior wall or in an external flow port. In a concentric bearing MRFE damper, elastomeric material is injected and cured in the annular gap between a pair of concentric tubes, and an MR fluid reservoir, as well as a piston-mounted MR valve, is housed inside the interior volume of the innermost tube. The fluid reservoir is fixed relative to the inner tube, and the piston is fixed relative to the outer tube. The key benefits and payoffs of the proposed MRFE technology are as follows:

- Eliminates the detrimental effects of amplitude dependent damping loss at both very low amplitudes (below 0.5% strain) and high amplitudes (above 10% strain)
- Adjusts damping to augment stability and performance as a function of flight condition
- Adjusts damping to mitigate temperature-dependent stiffening and softening at low and high temperatures, respectively.
- MRFE damper technology has no (or fewer) moving parts, offering increased reliability
- Passive damping for fail-safe, reduced power, or no power operation
- Retro-fit capable system, controlled/powered through existing rotor de-icing slip ring
- Possible applications extend beyond rotary wing vehicles to fixed-wing and unmanned (air) vehicle applications Other features, advantages and characteristics of the present invention will become apparent after the following detailed description.

SUMMARY OF THE INVENTION

The present invention is designed to provide adaptable damping for the helicopter lag mode by employing a combination of controllable magnetorheological (MR) fluids (including, but not limited to those with bases of water, silicone, hydro-carbons, and glycol) and reliable viscoelastic materials, e.g., elastomers. In addition, features of this MagnetoRheological Fluid Elastic (MRFE) damper provide many qualities and advantages and ensure an outstanding performance as shown in this disclosure.

The invention provides a helicopter snubber damper, including a flexible MagnetoRheological (MR) fluid chamber and a flexible or rigid center or interior wall or damping plate, in which at least one MR flow valve is located. The snubber body can be made of metallic rings interspersed with elastomeric layers, or a multiple lamination of metallic and elastomeric ring layers. The cross-section of the snubber body can be in circular, elliptical, rectangular, and other symmetrical shapes. A cavity is enclosed in the snubber body, and is filled with MR fluid. A flexible or rigid center or interior wall can be placed in the cavity of the snubber body to divide the cavity into two MR fluid chambers. The shape of the center or interior wall should be compatible with the cavity in the snubber body. At least one flow port or MR valve can be located in the center or interior wall, and the MR fluid in the fluid chambers can communicate with each other though MR valves. In an alternative configuration, the two fluid chambers communicate through an external flow channel in which the MR valve is enclosed. As the said snubber damper is installed in a helicopter rotor system, lead-lag motion of a blade can induce shear deformation of the flexible chamber of the snubber along the out-of-surface axis of the center or interior wall. Thus, the MR fluid in one fluid chamber can be forced to flow through the MR valve into the other fluid chamber. The deformation of the flexible chamber can provide passive stiffness, and the said MR valve can provide field-controllable damping force.

In one embodiment of the MR snubber, a snubber body can be made of plates interspersed with elastomeric layers, or a multiple lamination of metallic and elastomeric ring layers. A flexible center or interior wall can be placed within the cavity of the snubber body to divide the cavity into two MR fluid chambers. The flexible center or interior wall can be rubber-molded with the flexible chamber such that the fluid cannot flow through the surrounding edges of the plate. In this case, the upper and lower side of the snubber body can be stationary, and the snubber body can be deformed from the middle section. The flow port or MR valve can be located in the middle of the flexible plate, and the deformation of the snubber body can force the MR fluid to flow through the MR valve. The said flow valve is configured to be influenced by a magnetic field, which is provided by an electromagnetic coil enclosed in the valve such that the said MR fluid flowing through the said flow valve can be regulated. The said flow valve can be comprised of either regular rectilinear valves or porous valves, and accordingly, the said coil can be enclosed inside the flow port or valve.

In an alternate embodiment of the MR snubber damper, a snubber body can be made of plates interspersed with elastomeric layers, or a multiple lamination of metallic and elastomeric ring layers. A flexible center or interior wall can be placed within the cavity of the snubber body to divide the cavity into two MR fluid chambers. The flexible center or interior wall can be rubber-molded with the flexible chamber such that the fluid cannot flow through the surrounding edges of the plate. In this case, the upper and lower side of the snubber body can be stationary, and the snubber body can be deformed from the middle section. There are no flow ports in the center or interior wall of this embodiment, and instead, the MR fluid in two fluid chambers can communicate through an external flow channel. The flow port or MR valve can be enclosed in the external, e.g., bypass, channel, and the deformation of the snubber body can force the MR fluid to flow through the MR valve. The said flow valve is configured to be influenced by a magnetic field, which is provided by an electromagnetic coil enclosed in the valve such that the said MR fluid flowing through the said flow valve can be regulated. The said external flow valve can be comprised of either regular rectilinear valves or porous valves, and the geometry of the valve will not be constrained by the size of the center or interior wall.

In yet another embodiment of the MR snubber damper, a snubber body can be made of plates interspersed with elastomeric layers, or a multiple lamination of metallic and elastomeric ring layers. A rigid or semi-rigid center or interior wall can be placed within the cavity of the snubber body to divide the cavity into two MR fluid chambers. The upper edge of the center or interior wall can be fixed with the top side of the snubber body. The other peripheral edges of the center or interior wall can be free relative to the flexible chamber, but elastomeric or rubber seal can be used to prevent fluids in the fluid chambers from communicating through the edges. As the top side of the snubber body is sheared relatively to the bottom side, the center or interior wall can move through the MR fluid reservoir in a paddle-like motion. MR valves can, for example, be located near the lower edge of the paddle such that the MR fluid flows through the valve with higher flow rate. The MR valve can be activated using an electromagnet mounted at the center post of the center or interior wall. The MR valves will allow flow through the valves in the absence of field, but in the presence of magnetic field, the MR valves will impede flow through the valves. By varying the magnetic field, the MR damping component can be substantially modified. Meanwhile, in those snubber configurations, a pneumatic accumulator or air bladder may be incorporated into the snubber body to pressurize the flow to prevent cavitation.

The invention also provides a concentric bearing MRFE lag damper, including an elastomeric component and a magnetorheological (MR) component. The said elastomeric component is made of two concentric cylindrical tubes, with an elastomeric layer sandwiched between the outer and inner tubes. The volume enclosed by the said inner tube forms a cylindrical inner chamber. The said outer tube is attached to a rotor head, and the inner tube connected to a blade root. Thus, the lead-lag motion of the blade induces a relative translation between the said inner tube and the said outer tube, which in turn leads to a shear deformation of the said elastomer along the said cylindrical chamber body length. The deformation of the said elastomer provides passive stiffness and damping for the lead-lag mode of the rotor blade. The said MR component is enclosed in the said inner chamber, and it comprises MR fluids and a piston seated in the said chamber. The said piston divides the said inner cylinder into a first chamber positioned on one side of the piston assembly and a second chamber positioned on the opposite side of the piston. The said MR fluid in the first chamber communicates with MR fluid in the second chamber through a field-activated valve in the said piston. The piston is fixed relative to the outer tube, and the relative motion between the inner and outer tube forces the MR fluid to flow through the said valve, so that field-dependent damping force is added to the output force of the damper. The said flow valve is configured to be influenced by the magnetic field, which is provided by an electromagnet enclosed in the piston such that the said MR fluid flowing through the said flow valve can be regulated. The said flow valve can be comprised of either regular rectilinear valves or porous valves, and accordingly, the said solenoid can be seated inside the said piston or outside the fluid chamber.

An alternate embodiment of the concentric MRFE damper comprises two concentric cylindrical tubes and a flow mode piston-rod assembly in structures. An outer tube is attached to the rotor head, and an inner tube connected to the blade root. An elastomeric layer is sandwiched between the said outer tube and said inner tube. The volume enclosed in the said inner tube forms a cylindrical MR fluid chamber. A flow mode piston-rod assembly and MR fluids are included in the said fluid chamber, and the piston divides the said inner cylinder into a first chamber positioned on the rod side of the piston assembly and a second chamber positioned on the opposite side of the piston. The MR fluid in the first chamber communicates with the MR fluid in the second chamber through a field-activated valve in the said piston. The said flow valve is configured to be influenced by the magnetic field, which is provided by an electromagnet enclosed in the piston such that the said MR fluid flowing through the said flow valve can be regulated. To allow for volumetric compensation as the said rod slides in and out of the cylinder and to prevent fluid cavitation, a pneumatic chamber is located at one end of the said second fluid chamber. The said pneumatic chamber allows for volumetric compensation as the said rod slides in and out of the cylinder. The said rod and piston assembly is fixed relative to the said outer tube. An elastomeric rod seal is sandwiched between the said inner tube and said rod in a configuration so that a conventional sliding rod seal is eliminated. Thus, the lead-lag motion of the blade induces a relative translation between the said inner tube and the said outer tube, which in turn leads to a shear deformation of the said elastomer along the said cylindrical chamber body length. The deformation of the said elastomer provides passive stiffness and damping for the lead-lag mode of the rotor blade. Meanwhile, the lead-lag motion induces a relative translation between the said piston-rod assembly and the said inner tube, and forces the MR fluid to flow through the said valve so that field-dependent damping force is added to the output force of the damper. In addition, the lead-lag motion leads to a shear deformation of the said elastomeric seal, and the deformation of the said seal provides additional stiffness and damping. This embodiment of the invention also provides a space to accommodate a counter centrifugal force device such as an electromagnetic coil to provide longitudinal magnetic force to mitigate effect of sedimentation of the iron particles due to a centrifugal force field.

Yet another embodiment of the concentric MRFE damper comprises similar structures of the first embodiment. An outer tube is attached to a rotor head, and an inner tube connected to a blade root. An elastomeric layer is sandwiched between the said outer tube and said inner tube. The volume enclosed in the said inner tube forms a cylindrical MR fluid chamber. A flow mode piston-rod assembly and MR fluid are included in the said fluid chamber, and the piston divides the said inner cylinder into a first chamber positioned on the rod side of the piston assembly and a second chamber positioned on the opposite side of the piston. The said MR fluid in the first chamber communicates with MR fluid in the second chamber through a field-activated valve in the said piston. The said flow valve is configured to be influenced by the magnetic field, which is provided by an electromagnet enclosed in the piston such that the said MR fluid flowing through the said flow valve can be regulated. To allow for volumetric compensation as the said rod slides in and out of the cylinder and to prevent fluid cavitation, a pneumatic chamber is located at one end of the said second fluid chamber. The said pneumatic chamber allows for volumetric compensation as the said rod slides in and out of the cylinder. The said rod and piston assembly is fixed relative to the said outer tube. Instead of an elastomeric rod seal in the first embodiment, a stiff tube end cover is used to allow the said piston rod to slide in and out of the said fluid chamber. A sliding seal or U-cup is enclosed in the end cover to prevent fluid leakage due to the rod motion. In this embodiment, the lead-lag motion of the blade induces a relative translation between the said inner tube and the said outer tube, which in turn leads to a shear deformation of the said elastomer along the said cylindrical chamber body length. The deformation of the said elastomer provides passive stiffness and damping for the lead-lag mode of the rotor blade. Meanwhile, the lead-lag motion induces a relative translation between the said piston-rod assembly and the said inner tube, and forces the MR fluid to flow through the said valve so that field-dependent damping force is added to the output force of the damper.

For regulation of the magnetic field in each of the preferred embodiments, a variety of control techniques are applicable, including both open-loop and closed-loop systems. The open-loop control approaches regulate the magnetic field based on at least one measurement signal input (including, but not limited to, force level, blade lag angle, fluid temperature, and ambient temperature), producing a corresponding output current to the electromagnetic control valve(s). The closed-loop control approaches generally require at least one feedback variable, which may include, but is not limited to, at least one of the following: force, displacement, angle, temperature, damping, energy dissipation.

The invention provides a snubber type and a concentric bearing type MRFE damper to provide adaptive damping and stiffness to the lead-lag mode of a helicopter blade. The combination of the elastomer and the MR fluid makes it possible to construct a lead-lag damper to satisfy various lag damping requirements on a helicopter. Other features and advantages of the present invention will become apparent from the following description of preferred embodiments which refer to accompanying drawings.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a magnetorheological fluid elastic lag damper for damping helicopter rotors in lag mode that employs a combination of controllable magnetorheological (MR) fluids (including, but not limited to, those with bases of water, silicone, hydrocarbons, and glycol) and reliable viscoelastic materials.

Figure 1:
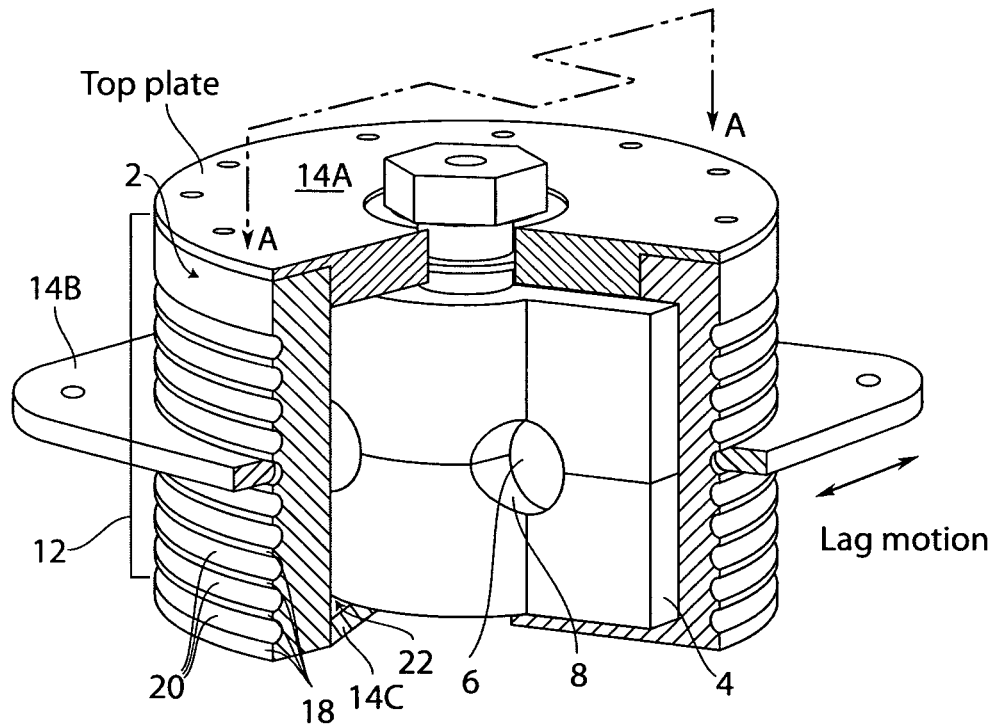
FIG. 1 is a partially sectioned isometric view of an MRFE snubber type lag damper.

A first embodiment of the snubber type lag damper is depicted in FIG. 1. In this embodiment, the damper comprises a flexible damper body 2 enclosing a flexible interior (e.g., center) wall (or damping plate) 4, and one or more MR flow ports 6 in the wall 4 with valves 8 therein. The flexible damper body 2 includes a flexible annular wall 12 and installation plates 14A, 14B, 14C. The flexible wall 12 is made of metallic rings 18 interspersed with elastomeric layers 20, or a multiple lamination of metallic rings 18 and elastomeric ring layers 20. Three separate installation plates, top plate 14A, bottom plate 14C and middle plate 14B as depicted in FIG. 1, are molded, bolted or otherwise sealed together with the flexible wall 12. The flexible wall 12 and installation plates 14A-C enclose a cavity 22, and the cross sectional shape of the cavity 22 can be circular, elliptical, rectangular, or of other preferably symmetric shapes.

Figure 2:
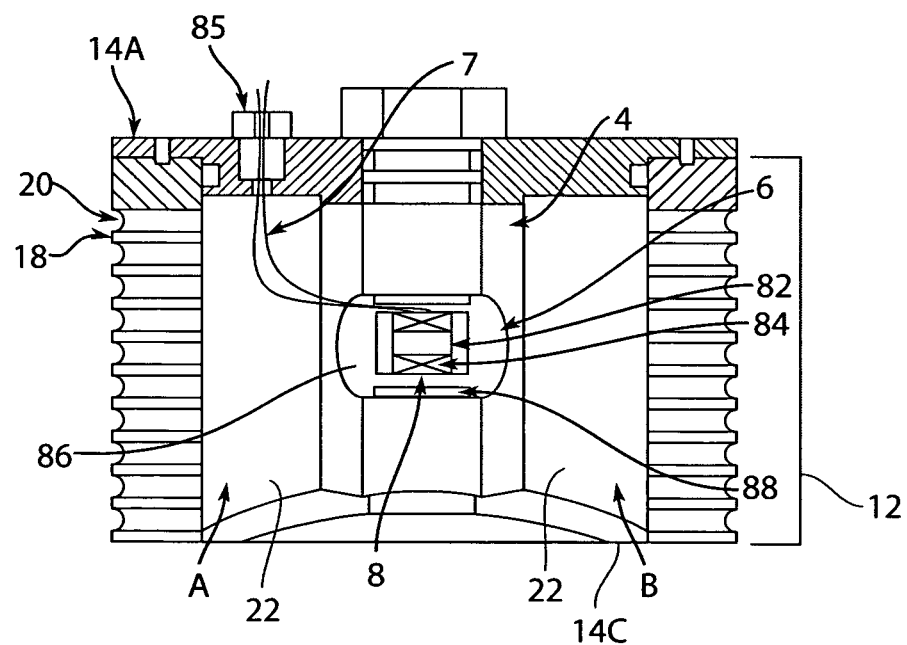
FIG. 2 is a cross-sectioned view (cut section A-A in FIG. 1, middle plate not shown) of an MRFE snubber with a flow mode MR valve.

FIG. 2 is a cross-sectional view A-A of the first snubber embodiment of FIG. 1. The cavity 22 is filled with MR fluid. The flexible interior wall 4 is seated within the cavity 22 to divide the cavity 22 into MR fluid chamber A and MR fluid chamber B along the lag motion direction as depicted in FIG. 1. To eliminate fluid leakage, edges of the interior wall 4 are molded together with the flexible wall 12 and the bottom installation plate 14C, and the top plate 14A is pre-compressed on or molded with the interior wall 4. In the interior wall 4, at least one flow port 6 is located, and the MR fluid in the fluid chamber A can communicate with fluid chamber B through flow port(s) 6. Various MR valves can be incorporated in the flow port(s) 6. In this embodiment, the MR valve 8 includes a coil bobbin 82, a magnetic coil 84 or solenoid wound about the bobbin 82, a flux return guide 88, and an active annular gap 86, whereby MR fluids flowing through the active gap 86 will be affected by a magnetic field generated by the magnetic coil 84, and flow resistance can be regulated as required by controlling an input current to the magnetic coil 84. The magnetic coil 84 is connected with an external power source outside the damper body 2 through a wire path 7, and the wire path 7 is either embedded in the interior wall 4 or immersed in the MR fluid, exiting the damper body 2 through a rubber-sealed wire ferrule 85 or connector bolted on the top plate 14A. To install the snubber damper in a helicopter rotor system, the top and bottom plates 14A, 14C can be fixed relative to an existing torque tube or cuff, and the middle plate 14B may be fixed relative to a helicopter rotor blade.

In operation, lead-lag motion of the blade will induce relative motion between the middle plate 14B and top/bottom plates 14A, 14C and shear deformation of the elastomer layers 20 in the flexible wall 12, and can force MR fluids to flow through the MR valve(s) 6 due to the volumetric change of the fluid chambers A, B. Thus, deformation of the elastomer layers 20 provides stiffness for the lead-lag mode of the rotor blade, and field-activated flow resistance through the MR valve(s) 6 provides controllable or semi-active damping force. To compensate fluid volume change due to temperature variation or prevent fluid cavitation, a known pneumatic accumulator can be attached to the top plate (optional and not shown in FIG. 1).

Referring to FIG. 2, a flow mode MR valve 8 is shown enclosed in the flow port 6. As described above, the flow mode MR valve 8 comprises coil bobbin 82, flux return guide 88, and annular gap 86 sandwiched between the coil bobbin 82 and flux return guide 88. In this configuration, all MR fluids traveling through the flow port 6 must flow through the annular gap 86, and the MR valve 8 contributes most of the damping force of the snubber damper. As the MR fluid is pushed from the chamber A(B) to chamber B(A) through the flow port 6 due to lag motion, the MR fluid flowing through the annular gap 86 will be affected by a magnetic field generated by the magnetic coil 84, and flow resistance can be regulated as required by controlling input current to the magnetic coil 84.

Figure 3:
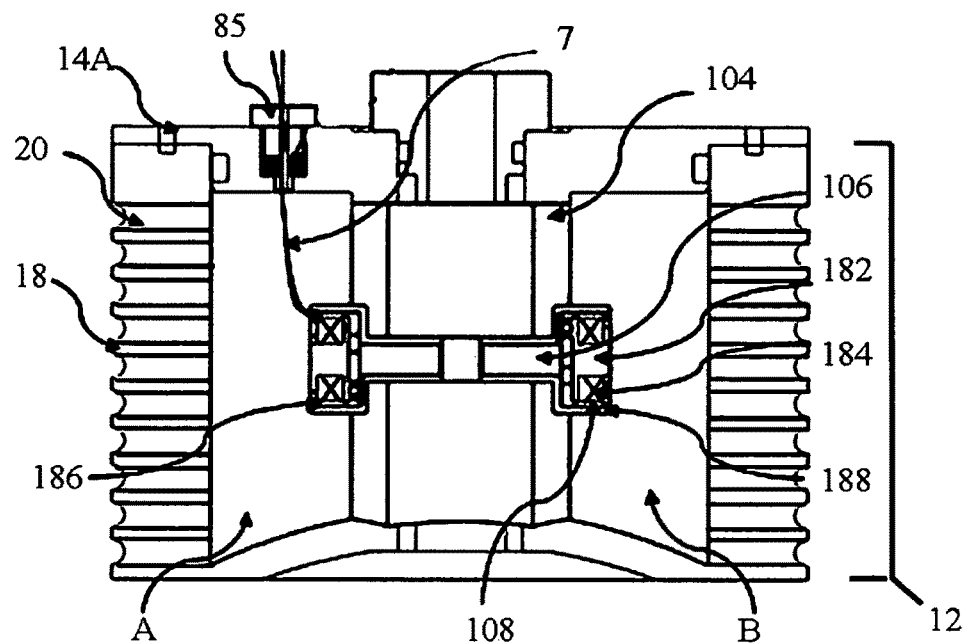
FIG. 3 is a cross-sectioned view (cut section A-A in FIG. 1, middle plate not shown) of an MRFE snubber with a flow mode MR valve (optional)

FIG. 3 is a cross-sectional view A-A of a snubber embodiment similar to FIG. 1 except using an alternative flow mode MR valve configuration as shown located at the entrance of flow port 106. Here the flow mode MR valve 108 comprises a coil bobbin 182 and a flux return guide 188, and an annular gap 186 sandwiched between the coil bobbin 182 and flux return guide 188. The flux return guide 188 of this MR valve 108 is plug-shaped, and may be externally-threaded such that it can be screwed into the flow port 106. An MR valve 108 can be located at one entrance or both entrances of the flow port 106. In this configuration, all MR fluids traveling through the flow port 106 also flow through the annular gap 186, and the MR valve 108 contributes controllable damping force and the flow port 106 contributes passive damping force. As the MR fluid is pushed from the chamber A(B) to chamber B(A) through the flow port 106 due to lag motion, the MR fluid flowing through the annular gap 186 will be affected by a magnetic field generated by the magnetic coil 184, and flow resistance can be regulated as required by controlling input current to the magnetic coil 184. The magnetic coil 184 can be connected with an external power source outside the damper body through a wire path, and the wire path is either embedded in the interior wall 104 or immersed in the MR fluid and leaves damper body through a rubber-sealed wire ferrule 185 or connector bolted on the top plate 14A.

Figure 4:
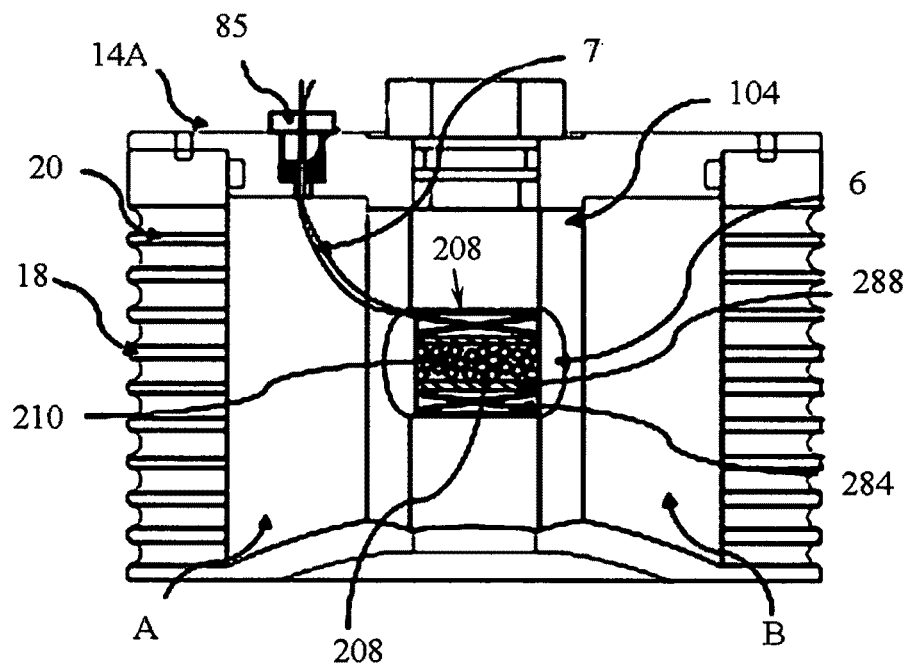
FIG. 4 is a cross-sectional view (cut section A-A in FIG. 1, middle plate not shown) of an MRFE snubber with a porous MR valve.

FIG. 4 is a cross-sectional view A-A of a snubber as in FIG. 1, with an alternative MR porous valve 208 shown enclosed in the flow port 6. The MR porous valve 208 comprises a non-magnetic steel tube 288, a center magnetic coil 284 wrapped around the tube 288, and porous media 210 enclosed in the tube 288. An important feature of the MR porous valve 208 is that both the MR fluid and porous media 210 are placed in the center magnetic coil 284 and may be designed to function as a magnetic flux guide. Natural tortuous fluid channels exist in porous media, thus, allowing non-unidirectional flow of MR fluid through the porous valve 208, resulting in a magnetic field with varying orientations relative to the velocity of the MR fluid. In such a configuration, mean values of the magnetic field applied to the MR fluid depend on material properties and the geometry of porous media resulting in flexible design requirements of the porous valve. Additionally or alternatively, the MR porous valve may improve damper efficiency and effectiveness because of the natural tortuous fluid channels existing in porous media. This natural consequence allows for the aggregate fluid channel length to be easily increased by the curvedness found in porous media. Also, yield and viscosity behavior of the MR fluid can be affected by the applied magnetic field as the consequence of the resulting capillary style of MR fluid pathway. In this configuration, all MR fluids traveling through the flow port 6 must flow through the porous media 210, and the MR porous valve 208 contributes the most damping force. As the MR fluid is pushed from chamber A(B) to chamber B(A) through the flow port 6 due to lag motion, the MR fluids flowing through the porous valve will be affected by a magnetic field generated by the magnetic coil 284, and flow resistance can be regulated as required by controlling input current to the magnetic coil 284. The magnetic coil 284 can be connected with an external power source outside the damper body through a wire path, and the wire path is either embedded in the interior wall or immersed in the MR fluid and leaves damper body through a rubber-sealed wire ferrule 285 or connector bolted on the top plate 14A.

The porous media 210 in FIG. 4 can be, but is not limited to magnetic or non-magnetic spheres as shown. Other examples of porous media 210 will be described here, though these examples are not meant to be limiting, and certainly encompass other similar and related extensions of these descriptions. Porous media 210 may be cylindrical columns or rods, irregular columns, arrays of hollow cylinders of either straight or circuitous geometries, bundled such arrays with various degrees of packing, non-bundled such arrays, flakes or other irregular shapes and any mixture of these particles where the mixture is based on morphology (shape), scale (size); a porous media may include one or more flat plates of arbitrary thickness aligned perpendicular to the flow each with one or more holes the holes in consecutive plates having varying degrees of overlap with arbitrary spacing between the consecutive plates. Porous media may include metallic and/or nonmetallic particles in various additional geometrical arrangements/forms, including, but not limited to open-cell foams, cellular structures such as what might be produced by sintering or lost foam casting, lattice structures, randomly or non-randomly oriented fiber or other columnar arrays (such as carbon nanofibers or tubes) that are sufficiently strong to not be compressed during damper operation. Also materials may be included in porous media that can be deformed elastically during damper operation but sufficiently strong so as to not be permanently deformed, i.e. deformed plastically during damper operation. Porous media can also be, at least in part, a shape memory alloy, the shape memory properties being utilized in either thermally or stress activated modes to effect controllable, and, depending on the arrangement, reversible changes in the geometry and arrangement of the filler material. The porosity of the porous media varies according to a required viscous damping and/or controllable damping range. In addition, the magnetic property of the porous media is dependent on the material, and may be magnetic or nonmagnetic.

Figure 5:
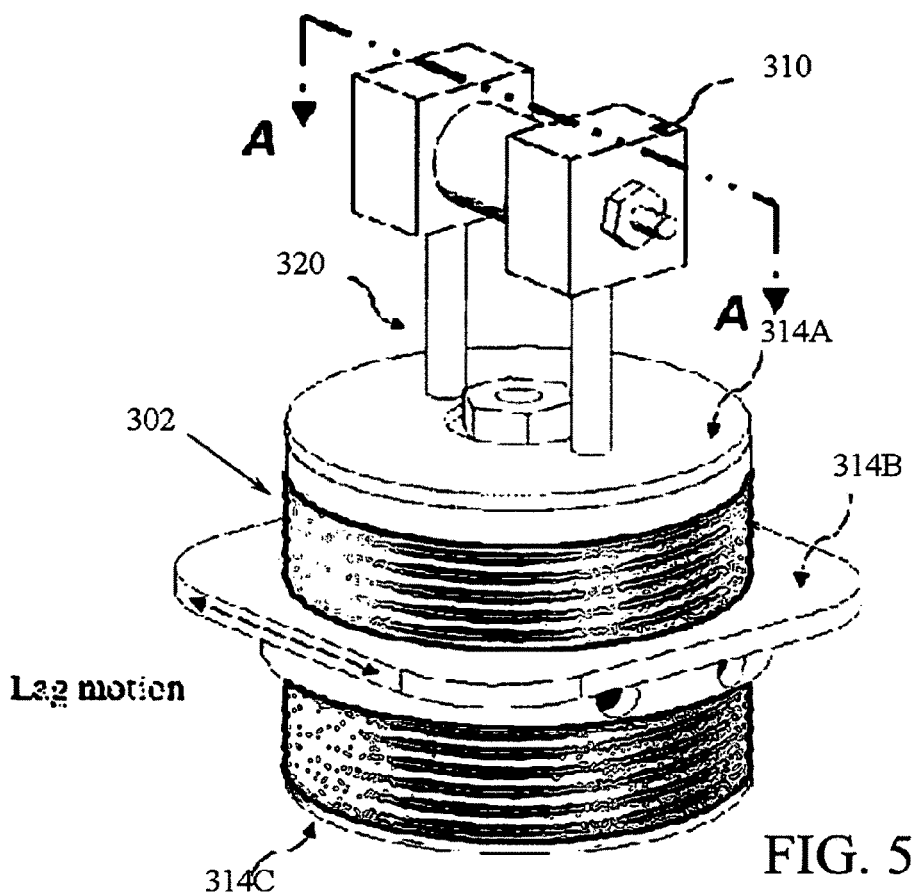
FIG. 5 is an isometric view of an MRFE snubber damper with an external flow port.
Figure 6:
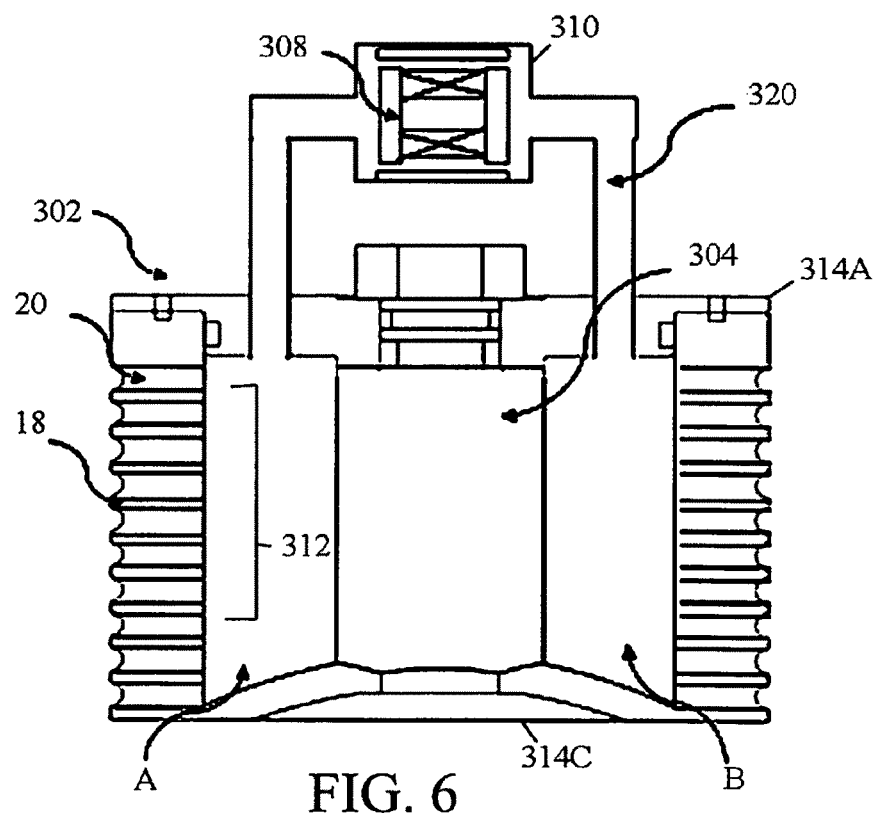
FIG. 6 is a cross-sectional view (cut section A-A in FIG. 5, middle plate not shown) of an MRFE snubber with an external MR flow mode valve.

Another embodiment of the snubber type lag damper is depicted in FIGS. 5-6. In this embodiment, the damper comprises a flexible damper body 302, a flexible interior wall 304 or damping plate, an external flow port 320, and an MR valve 308 contained within an MR valve body 310. The flexible damper body 302 is made of flexible wall 312 (e.g., metallic rings 18 interspersed with elastomeric layers 20) and installation plates (e.g., one or more installation plates 314A, 314B, 314C) similar to those of FIG. 1. Three separate installation plates, top plate 314A, bottom plate 314C and middle plate 314B as depicted in FIG. 5, are molded, bolted or otherwise sealed together with the flexible wall.

The flexible wall 312 and installation plates 314A-C enclose a cavity, and the cross sectional shape of the cavity can be circular, elliptical, rectangular or of other symmetric shapes. The cavity is filled with MR fluid. The flexible interior wall 304 is seated within the cavity to divide the cavity into MR fluid chamber A and MR fluid chamber B along the lag motion direction as depicted in FIG. 5. To eliminate fluid leakage, edges of the interior wall 304 are molded together with the flexible wall 312 and bottom installation plates 314C, and the top plate 314A is bolted or molded with the interior wall 304. An external flow port 320 is installed on the top plate 314A, through which one end of the flow port 320 is connected with the fluid chamber A and the other end is connected with the fluid chamber B. The MR fluid in the fluid chamber A can communicate with fluid chamber B though the external flow port 320. An MR valve body 310 can be located in the middle of the external flow port 320, and various types MR valves 308 can be incorporated in the MR valve body 310. As in the embodiment of FIG. 2, the MR valve 308 embodiment may include a coil bobbin, a magnetic coil or solenoid wound about the bobbin, a flux return guide, and an active annular gap, whereby MR fluids flowing through the active gap will be affected by a magnetic field generated by the magnetic coil, and flow resistance can be regulated as required by controlling an input current to the magnetic coil. The magnetic coil can be connected with an external power source outside the damper body through a wire path located on the valve body (not shown in FIG. 5). While the snubber damper is installed in a helicopter rotor system, the top and bottom plates 314A, 314C can be fixed relative to a torque tube or cuff, and the middle plate is fixed relative to a helicopter rotor blade.

In operation, lead-lag motion of the blade can induce relative motion between the middle plate 314B and top/bottom plates 314A, C and shear deformation of the elastomer layers in the flexible wall, and can force MR fluids to flow through the external flow port 320 and then the MR valve 308 due to the volumetric change of the fluid chambers. Thus, deformation of the elastomer layers provides stiffness for the lead-lag mode of the rotor blade, and field-activated flow resistance through the MR valves 308 provides controllable or semi-active damping force. To compensate fluid volume change due to temperature variation or to prevent fluid cavitation, a pneumatic accumulator (not shown) can be attached to the top plate.

FIG. 6 is a cross-sectional view A-A of the snubber embodiment of FIG. 5, in which the flow mode MR valve 308 is shown enclosed in the external flow port 320. Again, the flow mode MR valve 308 comprises a coil bobbin, flux return guide, and an annular gap sandwiched between the coil bobbin and flux return guide. All MR fluids traveling through the external flow port 320 must flow through the annular gap, and the MR valve 308 contributes most damping force of the snubber damper (if the diameter of the external flow port 320 is large enough). As the MR fluid is pushed from chamber A(B) to chamber B(A) through the external flow port 320 due to lag motion, the MR fluids flowing through the annular gap will be affected by a magnetic field generated by the magnetic coil, and flow resistance can be regulated as required by controlling input current to the magnetic coil. The magnetic coil can be connected with an external power source through a wire path located on the MR valve body (not shown in FIG. 6).

Figure 7:
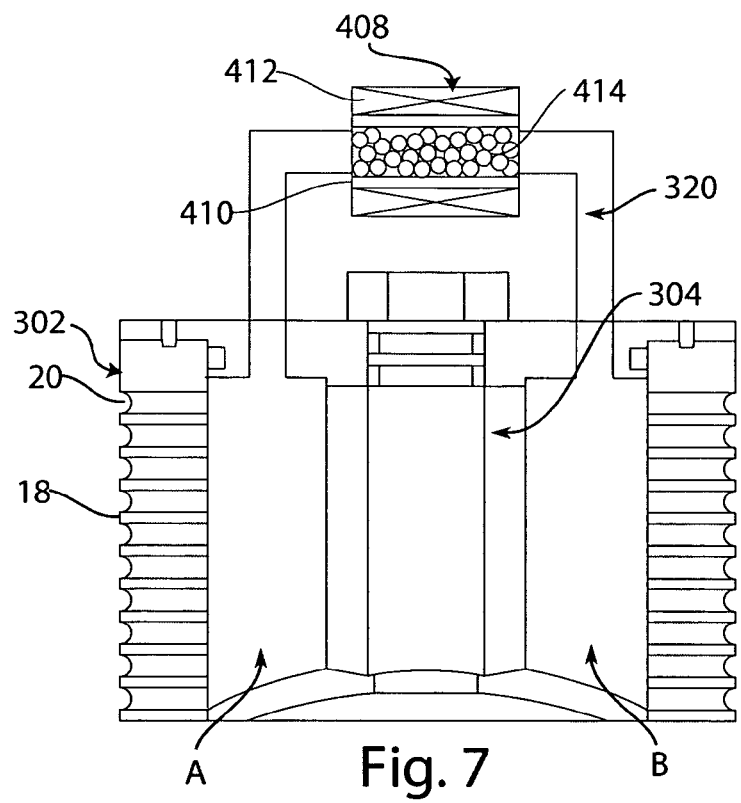
FIG. 7 is a cross-sectional view (cut section A-A in FIG. 5, middle plate not shown) of an MRFE snubber with an external MR porous valve.

FIG. 7 is a cross-sectional view A-A of the snubber embodiment similar to that of FIG. 5 except that an alternate embodiment of an MR porous valve 408 is shown enclosed in the external flow port 320, and is similar to that of FIG. 4 likewise comprising a nonmagnetic steel tube 410, a center magnetic coil 412 wrapped around the tube, and porous media 414 enclosed in the tube. An important feature of the MR porous valve 408 is that both MR fluid and porous media 414 are placed in the center magnetic coil 412 and may be designed to function as a magnetic flux guide. Natural tortuous fluid channels exist in porous media, thus, allowing non-unidirectional flow of MR fluid through porous valve 408, resulting in magnetic field with varying orientations relative to the velocity of the MR fluid. In such a configuration, mean values of the magnetic field applied to the MR fluid depend on material properties and the geometry of porous media 414 resulting in flexible design requirements of porous valve 408. Additionally or alternatively, the MR porous valve may improve damper efficiency and effectiveness because of the natural tortuous fluid channels existing in porous media 414. This natural consequence allows for the aggregate fluid channel length to be easily increased by the curvedness found porous media. Also, yield and viscosity behavior of the MR fluid can be affected by the applied magnetic field as the consequence of the resulting capillary style of MR fluid pathway. In this configuration, all MR fluids traveling through the external flow port must flow through the porous media, and the MR porous valve contributes most damping force. As the MR fluid is pushed from chamber A(B) to chamber B(A) through the external flow port 320 due to lag motion, the MR fluids flowing through the porous valve 408 will be affected by a magnetic field generated by the magnetic coil 412, and flow resistance can be regulated as required by controlling input current to the magnetic coil 412. The magnetic coil 412 can be connected with a power source outside the damper body through a wire path, located on the MR valve body (not shown in FIG. 7).

The porous media in FIG. 7 can be, but is not limited to magnetic or nonmagnetic spheres as shown, or other examples as described above in regard to FIG. 4.

Figure 8:
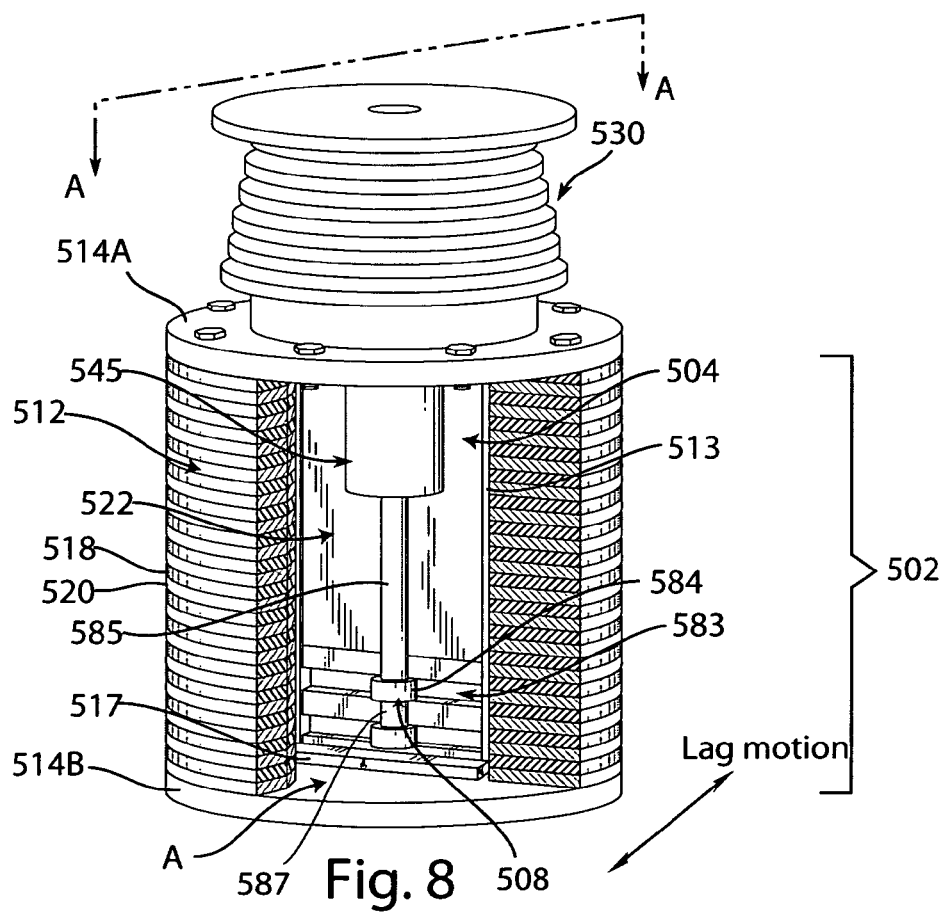
FIG. 8 is a partially sectioned isometric view of an optional MRFE snubber type lag damper.

Referring to FIG. 8, another alternate snubber type lag damper is shown with a different MR valve configuration. In this embodiment, the damper comprises a flexible damper body 502, an interior wall or paddle 504, one or more MR flow valves 508, and an optional centering bearing 530. The flexible damper body 502 is made of flexible wall 512 and installation plates 514a, 514b. The flexible wall 512 is made of metallic rings 518 interspersed with elastomeric layers 520, or a multiple lamination of metallic ring layers 518 and elastomeric ring layers 520. Two separate installation plates, top plate 514A and bottom plate 514B as shown in FIG. 8, are molded, bolted or otherwise sealed together with the flexible wall 512. A cavity 522 is enclosed by the flexible wall 512 and installation plates 514A, 514B, and the cross-sectional shape of the cavity 522 can be circular, elliptical, rectangular, or of other symmetric shapes. The cavity 522 is filled with MR fluid. The interior wall 504 is seated within the cavity 522 to divide the cavity into MR fluid chamber A and MR fluid chamber B along the lag motion direction as depicted in FIG. 8. The upper flange of the interior wall 504 can be molded together with the top plate 514A. The interior wall 504 can be rigid or semi-rigid, and will be sealed around its vertical edges using an elastomeric membrane or rubber seal 513 (as shown) and with a simple lip seal 517 on the horizontal bottom edge. The interior wall 504 is preferably of rectangular cross-section, but a cruciform cross-section is also possible. The lower flange of the interior wall 504 will have at least one MR valve 508 that can be activated using at least one electromagnet mounted, for instance, at a center post 585 of the interior wall 504. The MR valve 508 comprises a center electromagnet with coil 584 wound about a center post 585, flux return arm 587 and flow gap 583. The center post 585 and flux return arm 587 are made of high-magnetic-permeability materials, and they are used to guide a controllable magnetic field across the fluid gap 583 in conjunction with the electromagnet. Specifically, a magnetic field is created by the central electromagnet, and the field is then shunted outward through the upper arms, and then turned downwards though the outer flux guides and across the gap 583. The lower arms then return the field through the electromagnet. The electromagnet can be connected with an external power source outside the damper body through a wire path, and the wire path can be enclosed in the center post 585. The MR valve(s) 508 will allow flow through the valve(s) 508 in the absence of field, but in the presence of magnetic field, the MR valve(s) 508 will impede flow through the valves. By varying the magnetic field, the MR damping component can be greatly modified. A pneumatic accumulator or air bladder can be attached to the top plate 514A to pressurize the MR fluid to compensate fluid volume change due to temperature variation or to prevent fluid cavitation. The optional centering bearing 530 functions as a joint to allow blade pitch and flap motion.

To install the snubber damper in a helicopter rotor system, the top plate 514A or center bearing 530 can be connected with a toque tube or cuff, and the bottom plate 514B is connected with a helicopter rotor blade.

In operation, lead-lag motion of the blade can induce relative motion between the bottom plate 514B and top plate 514A and shear deformation of the elastomer layers 520 in the flexible wall 512. The interior wall 504 will move through the MR fluid reservoir like a paddle as the stack of metal-elastomer layers 518, 520 shear relative to each other due to lag motion. The paddle motion of the interior wall 504 can force MR fluids to flow through the MR valve(s) 508. Thus, deformation of the elastomer layers 520 provides stiffness for the lead-lag mode of the rotor blade, and field-activated flow resistance through the MR valves 508 provides controllable or semi-active damping force.

Figure 9:
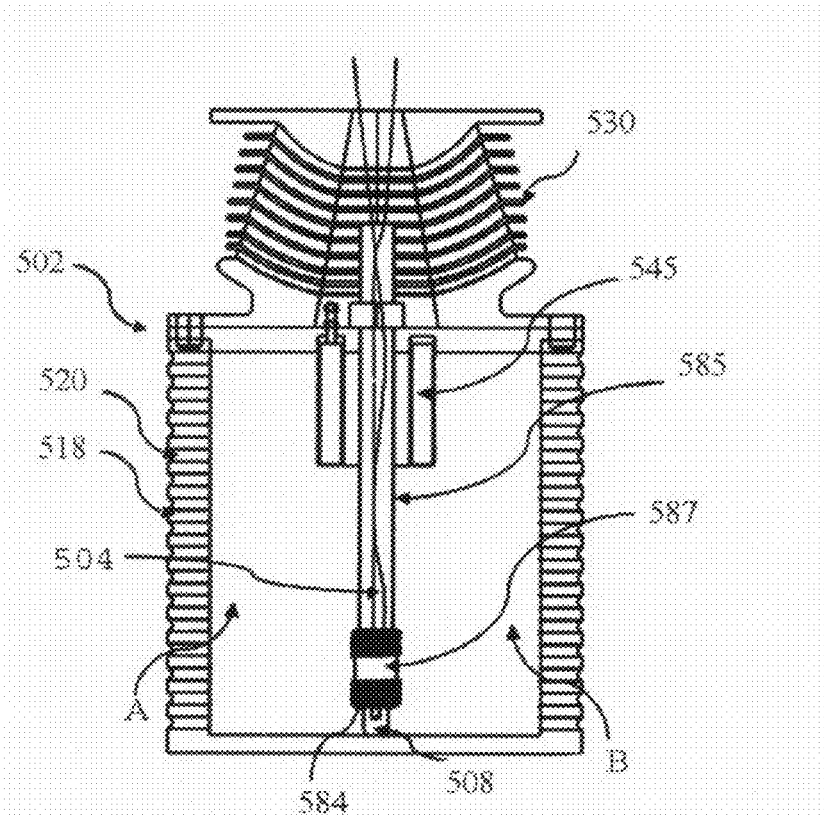
FIG. 9 is a cross-sectional view (cut section A-A in FIG. 8) of the MRFE snubber type lag damper in FIG. 8.

FIG. 9 is a cross-sectional view A-A of the snubber embodiment of FIG. 8, in which the paddle-like interior wall 504 (here rotated 90 degrees) is attached to the top plate 514A of the damper body 502 and divides the cavity into two fluid chambers A, B. The paddle 504 will move through the MR fluid reservoir inside the damper body 502 as the stack of metal-elastomer layers 518, 520 shear relative to each other due to lag motion. The paddle 504 will be sealed around its vertical edges using an elastomeric membrane 513 and with a simple lip seal 517 (as shown in FIG. 8) on the horizontal bottom edge. The lower flange of the paddle 504 has two MR valves 508 that can be activated using an electromagnet mounted at the center post 585 of the paddle 504. The MR valves 508 will allow flow through the valves 508 in the absence of field, but in the presence of magnetic field, the MR valves 508 will impede flow through the valves 508. By varying the magnetic field, the MR damping component can be substantially modified. An internal pneumatic accumulator or air bladder 545 is attached to the top plate 514A to pressurize the MR fluid to prevent cavitation.

A standard linearization technique, equivalent viscous damping, is used to evaluate the damping capacity of the MRFE snubber damper under sinusoidal excitation. The equivalent viscous damping is obtained by equating the energy dissipated over a cycle by the MRFE damper to the energy dissipated by an equivalent viscous damper.

Figure 10:
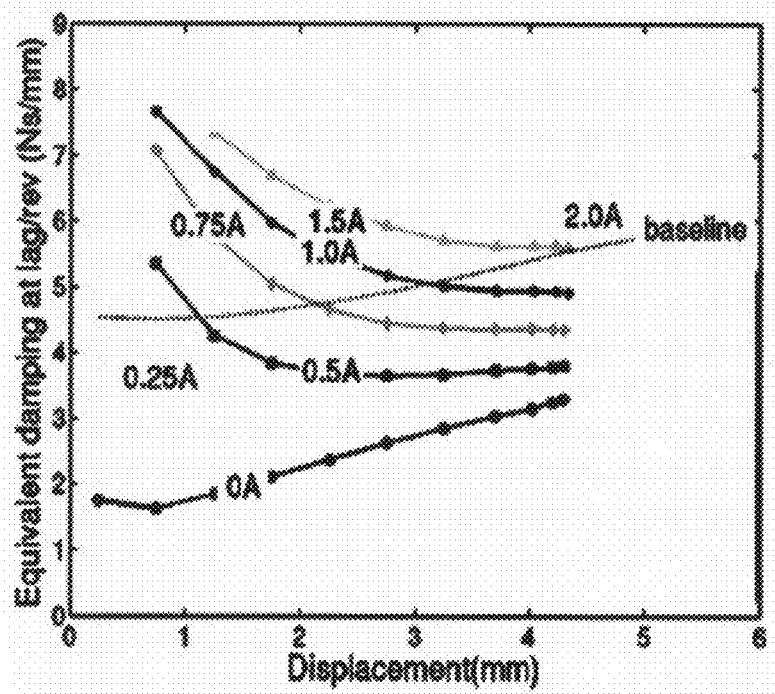
FIG. 10 is a graphical view of equivalent damping at lag/rev frequency with respect to displacement amplitude at lag/rev demonstrated by a prototype MRFE snubber damper, wherein the applied current is varied from 0 to 2 Amp.

FIG. 10 is a graph of the equivalent damping of a prototype snubber damper (as depicted in FIG. 2) at lag frequency as a function of lag motion for different applied currents. The dotted line in FIG. 10 is the baseline equivalent damping of a similar (passive) commercial snubber damper. It can be shown that the field-off (0 A) equivalent damping of the MRFE snubber is much lower than the baseline damping, which is beneficial for reducing helicopter hub load since high damping is only required at short period during one helicopter flight cycle. Comparatively, the maximum field-on equivalent damping (2 A) of the MRFE snubber is higher than the baseline damping such that the required lag damping at certain flight conditions can be achieved. Notably, the equivalent damping of the MRFE damper can be varied dramatically as a function of the applied current, and the minimum damping increase can be as high as 100% at the same lag motion condition. This allows a large damping controllable range and thus an optimized damping at different flight conditions.

Loss factor is also a key characterization parameter to describe the behavior of a spring-mass system, which is a ratio between quadrature stiffness and inphase stiffness.

Figure 11:
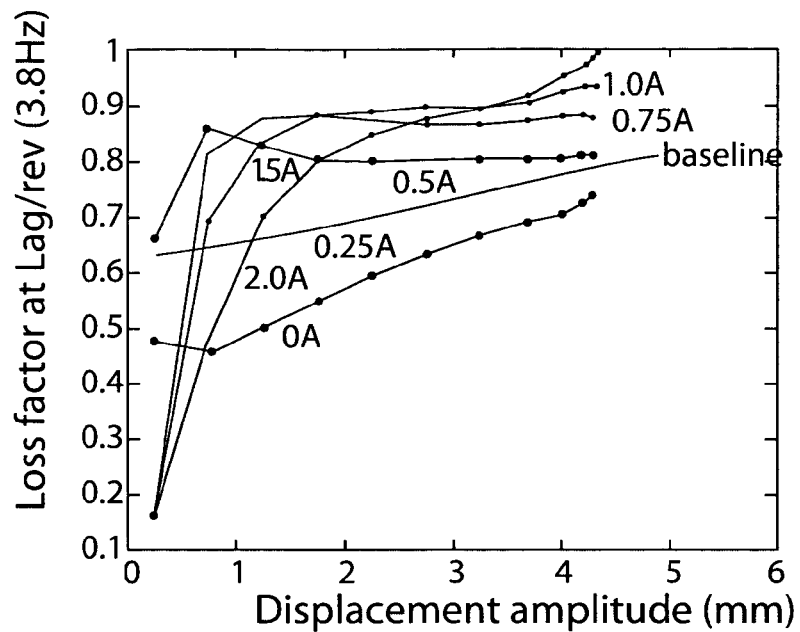
FIG. 11 is a graphical view of loss factor at lag/rev with respect to displacement amplitude at lag/rev demonstrated by a prototype MRFE snubber damper, wherein the applied current is varied from 0 to 2 Amp.

FIG. 11 gives an example of the loss factor of a prototype MRFE damper as in FIG. 2. The baseline loss factor shown as in dotted line is obtained from a similar (passive) commercial snubber damper. The field-off loss factor of the MRFE damper is at least 10% lower than the baseline damper. As the applied current increases, the loss factor of the MRFE snubber generally increases from 0.5 (0 A) to 0.9 (2 A). Moreover, both the stiffness and damping of the MR damper can be varied as the applied current on the MR valve varies. Notably, at small lag motion amplitudes, the loss factor decreases as the applied current is over 0.5 A since the blockage of the flow valve results in a much higher stiffness than the increase of the damping.

Figure 12:
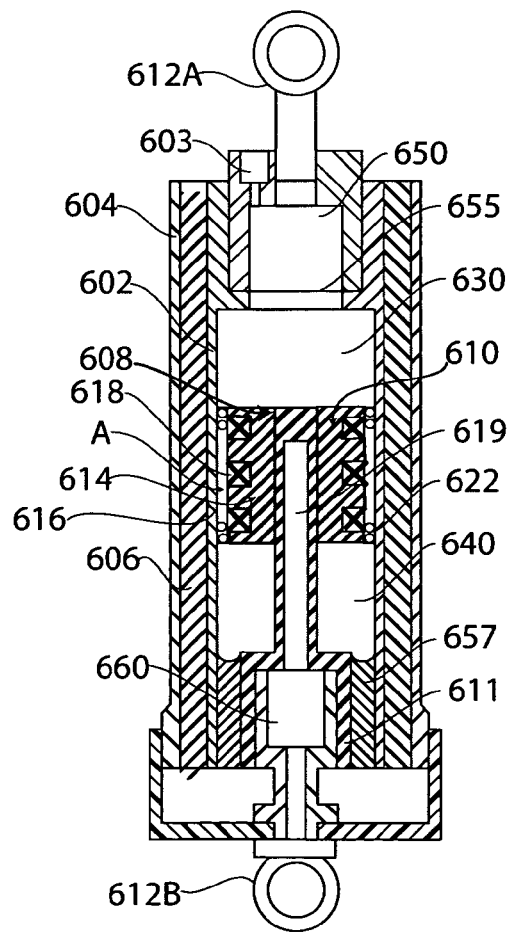
FIG. 12 is a cross sectional view of one embodiment of the concentric bearing type MRFE damper without a dynamic rod seal.

An alternative embodiment of a concentric bearing MRFE damper according to the present invention is depicted in FIG. 12. In this embodiment, the damper comprises a pair of concentric cylindrical (inner and outer) tubes 602, 604 with elastomeric material injected and cured in an annular gap occurring between the two tubes 602, 604, thereby forming an elastomeric layer 606. A piston-rod assembly 610 extends through the inner tube 602. This defines an MR fluid chamber including a flow gap A surrounding a piston-mounted MR valve 608 (or gap-mounted MR valve) also housed inside the interior volume of the inner tube 602. Thus, the position of the fluid chamber and flow gap A is fixed relative to the inner tube 602. However, the piston-rod assembly 610 is fixed relative to the outer tube 604. When installing in a helicopter, the outer tube 604 may be attached to the rotor head via coupling 612B, and the inner tube 602 is connected to the blade root via coupling 612A. To implement a piston-mounted MR valve 608, the piston 610 is equipped with a multi-stage spool-shaped piston head 614, and a guide rail 616 is attached around the outside of the piston head 614. Each stage of the spool-shaped (bobbin-like) piston head 614 comprises an upper outwardly extending flange and a lower outwardly extending flange defining an annular notch in between. Coil 618 is wound upon each spool-shaped piston head 614 within the notches between the upper flange and the lower flange. In this embodiment, three coils 618 are shown wound about the piston head 614. The coils may be connected externally through a wiring path 619 running interiorly of the piston 610. Piston rings 622 are installed on the guide rail 616 so that the piston 610 can move back-forth in the inner tube 602 with minimal friction. The cylindrical flow gap A is formed between the piston head 614 and the guide rail 616. The piston 610 divides the MR fluid chamber into a first chamber 630 positioned on the rod side of the piston-rod assembly 610 and a second chamber 640 positioned on the opposite side of the piston 610 as shown, both containing MR fluid. The MR fluid in the first chamber 630 communicates with MR fluid in the second chamber 640 through the field-activated flow gap A there between and surrounding the piston 610. The flow valve 608 is configured to be influenced by the magnetic field, which is provided by the coil 618 about the piston head 614 such that the MR fluid flowing through the flow valve 608 can be regulated. To allow for volumetric compensation as the piston rod 610 slides in and out of the fluid chambers 630, 640 and to prevent fluid cavitation, a pneumatic chamber 650 is located at one end (above) the first fluid chamber 630. A diaphragm 655 is interposed between the pneumatic chamber 650 and the first fluid chamber 630 in order to isolate the MR fluid from the air in the pneumatic chamber 650 and also to prevent MR fluid from leaking out of the device. An elastomeric rod seal 657 is sandwiched between the inner tube 602 and piston rod 610 to allow a relative motion between the rod 610 and the inner tube 602, and to eliminate a conventional sliding rod seal. This embodiment of the invention also provides a cup-shaped flare 611 at the lower end of the piston rod 610 defining a space 660 which accommodates a counter centrifugal force device such as an electromagnetic coil to provide longitudinal magnetic force to mitigate effect of sedimentation of the iron particles due to a centrifugal force field.

In operation, the lead-lag motion of the blade induces a relative translation between the inner tube 602 and the outer tube 604, which in turn leads to a shear deformation of the elastomer 606 along the cylindrical chamber body length. The deformation of the elastomer 606 provides passive stiffness and damping for the lead-lag mode of the rotor blade. Meanwhile, the lead-lag motion induces a relative translation between the piston-rod assembly 610 and the inner tube 602, and forces the MR fluid to flow through the valve 608 so that field-dependent damping force is added to the output force of the damper. In addition, the lead-lag motion leads to a shear deformation of the said elastomeric seal 657, and the deformation of the said seal provides additional stiffness and damping.

Figure 13:
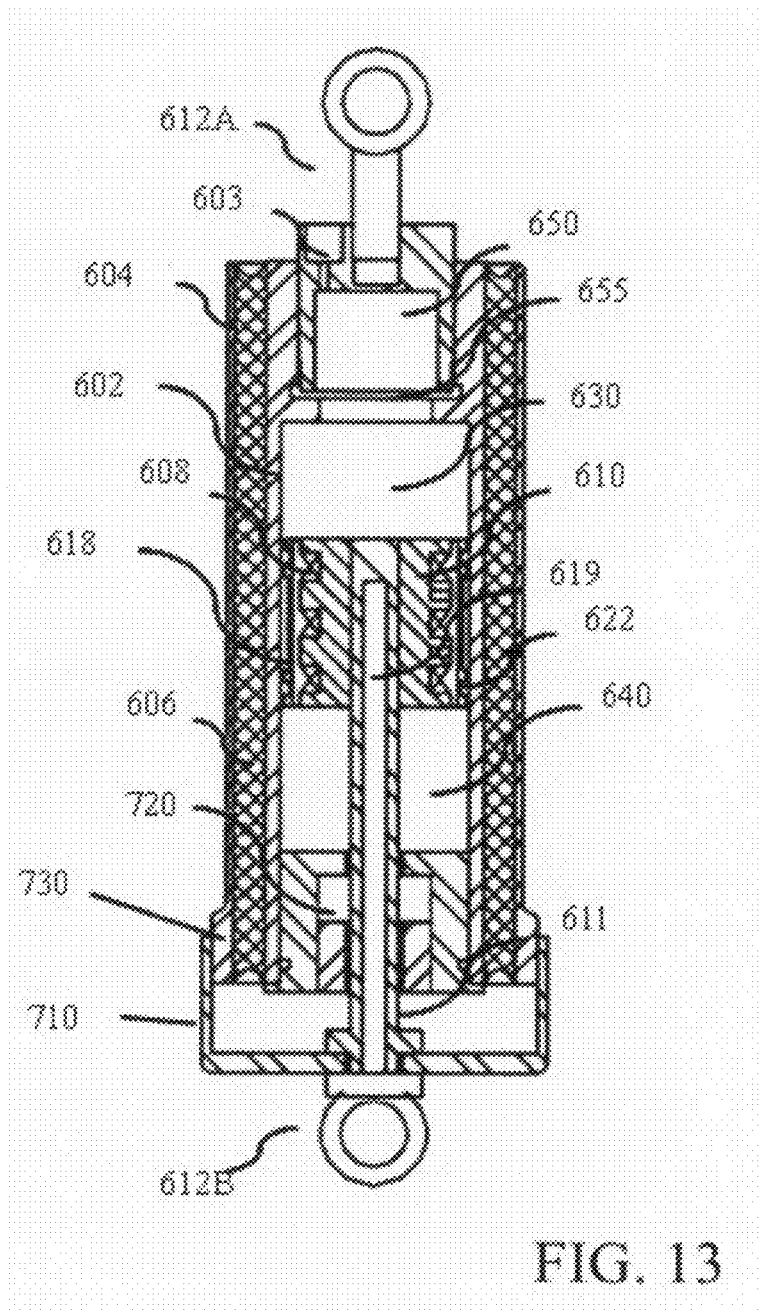
FIG. 13 is a cross sectional view of one optional embodiment of the concentric bearing type MRFE damper with sliding rod seal.

Referring to FIG. 13, an alternate concentric bearing MRFE damper is shown, which is similar to that of FIG. 12 except that it uses a rod sliding-seal. The components of the damper are similar to the first embodiment and like components are similarly designated, except that a stiff tube end cover 710 is used instead of the elastomeric seal 657 (of FIG. 12) to allow the piston rod 610 to slide in and out of the second fluid chamber 640. A sliding seal or U-cup 720 is enclosed in the end cover 710 to prevent MR fluid leakage due to the rod 610 motion. To prevent MR fluid leakage, a static o-ring seal 730 is used between the tube end cover 710 and inner tube.

In operation, the lead-lag motion of the blade induces a relative translation between the inner tube 602 and the outer tube 604, which in turn leads to a shear deformation of the elastomer 606 along the cylindrical chamber body length. The deformation of the elastomer 606 provides passive stiffness and damping for the lead-lag mode of the rotor blade. Meanwhile, the lead-lag motion induces a relative translation between the piston-rod assembly 610 and the inner tube 602, and forces the MR fluid to flow through the valve 608 so that field-dependent damping force is added to the output force of the damper.

Figure 14:
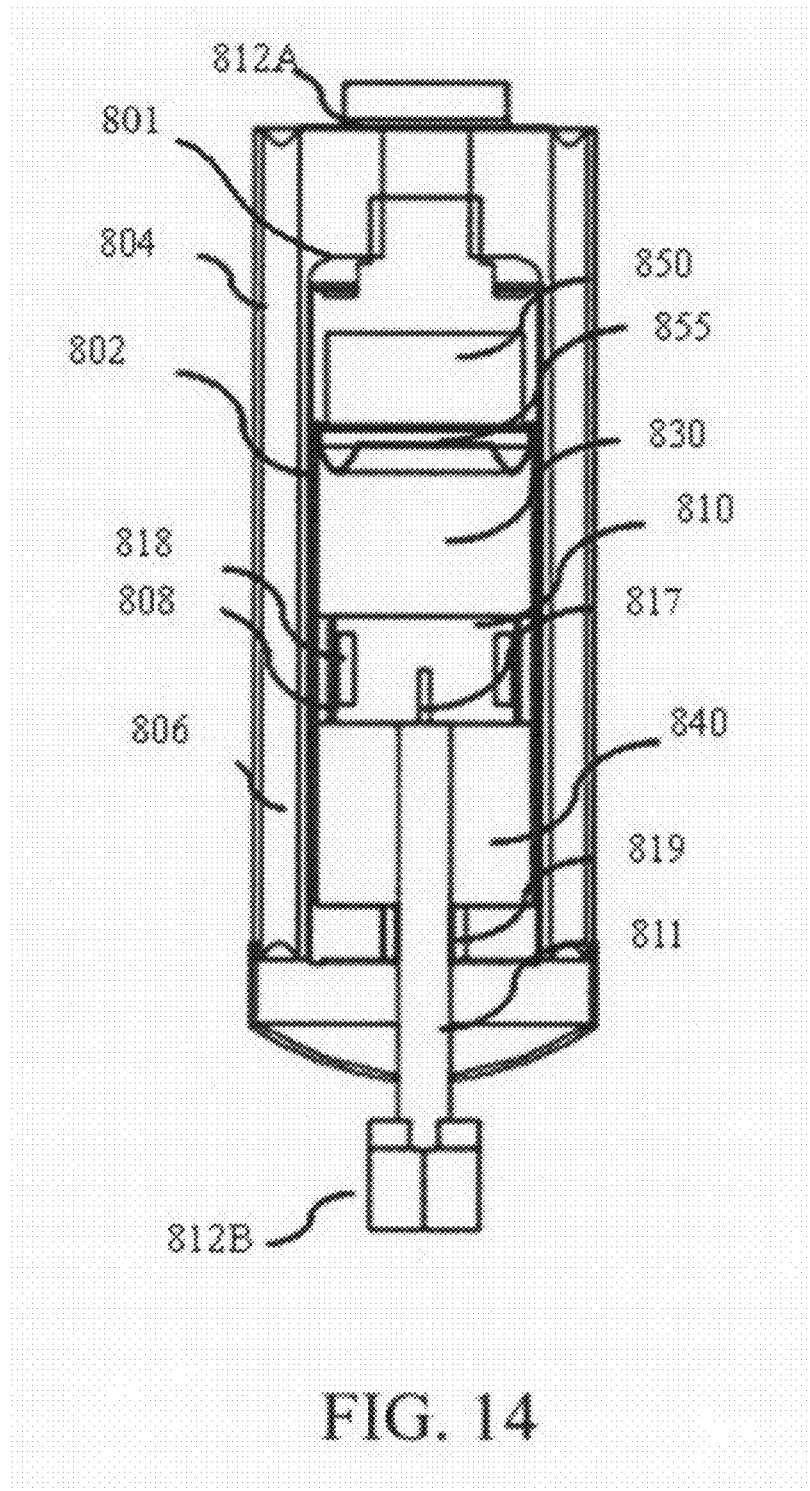
FIG. 14 is a schematic view of experimental configuration of the concept concentric bearing type MRFE damper.

Yet another alternate concept of a concentric bearing MRFE damper is depicted in FIG. 14, in the form of a concentric bearing type MRFE lag damper. This MRFE damper is better-suited as a retrofit for an existing concentric elastomeric bearing type damper. This embodiment is again similar to that of FIG. 12. This prototype MRFE damper can be fabricated using an existing linear stroke concentric elastomeric bearing damper, and insertion of an enclosed MR component 801, which further comprises components 810, 811, 830, 840, 850, and 855, as described below and shown in FIG. 14. Thus, the existing linear stroke elastomeric damper may be treated as the baseline damper for MRFE damper evaluation as described below.

The existing (baseline) elastomeric damper is made of two concentric cylindrical metal tubes 802, 804, with an elastomeric layer 806 sandwiched between an outer tube 804 and inner tube 802. The volume enclosed by the inner tube 802 forms a cylindrical inner chamber. To install in a helicopter, the outer tube 804 is attached to the rotor head through a rod-end 812B, and the inner tube 802 is connected to the blade root by using a threaded connection 812A. Thus, the lead-lag motion of the blade induces a relative translation between the inner tube 802 and the outer tube 804, which in turn leads to a shear deformation of the elastomer 806 along the damper body length. The deformation of the elastomer provides the required stiffness and damping for the lead-lag mode of the rotor blade, but the stiffness and damping of the damper are passive and cannot be varied as flight conditions are varied. Therefore, using an MR component 801 compatible in size with the inner chamber, a simplified MRFE damper is constructed. The MR component 801 further comprises an MR valve embedded piston 810 and an air chamber 850. The piston 810 divides the inner chamber into two MR fluid chambers 830 and 840, and a diaphragm 855 separates the air chamber 850 from the MR fluid chamber 830. A tubular flow gap or path 808 is included in the piston 810, and an embedded magnetic coil 818 is used to activate the MR fluid flowing through the gap 808. A shaft rod 811 is fixed relative to the piston 810 through a threaded connection 817. The fluid chambers 830 and 840 are fixed relative to the inner tube 802, and the piston 810 and rod 811 are fixed relative to the outer tube 804. A rod seal 819 is used to prevent leakage of the MR fluid. The relative motion between the inner tube 802 and outer tube 804 forces the MR fluid to flow through the field-activated gap 808 in the piston 810, so that field dependent damping force is added to the output force of the damper.

After fabricating the above-described MRFE damper, its controllable damping capacity was be characterized under loading conditions encountered by the baseline elastomeric damper. Complex modulus was used to characterize the prototype MRFE damper.

Figure 15:
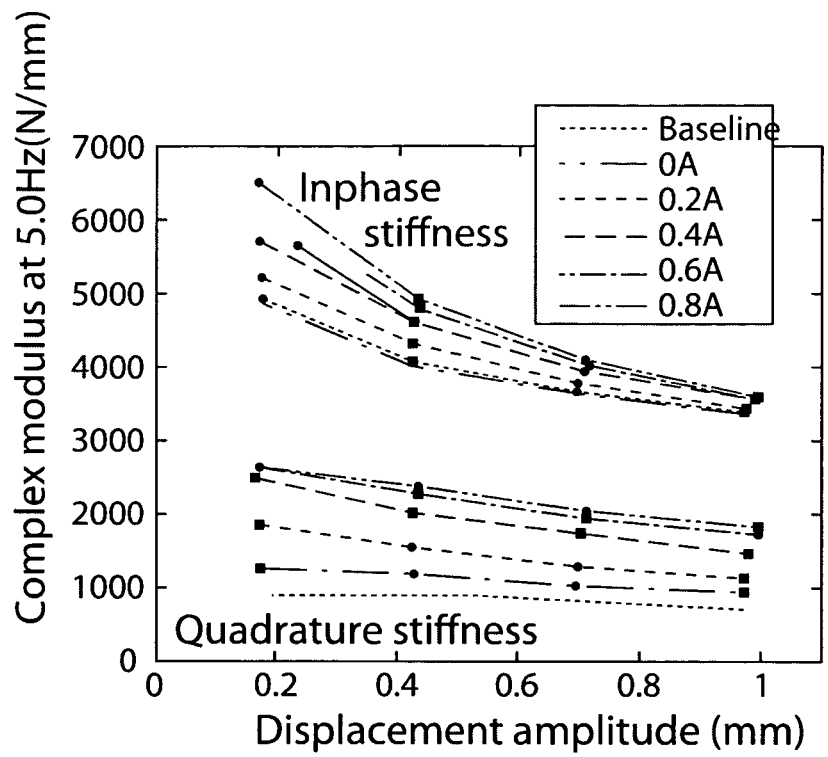
FIG. 15 is a graphical view of complex modulus at lag/rev with respect to displacement amplitude at lag/rev demonstrated by a prototype concentric bearing type MRFE damper, wherein the applied current is varied from 0 to 0.8 Amp.
Figure 16:
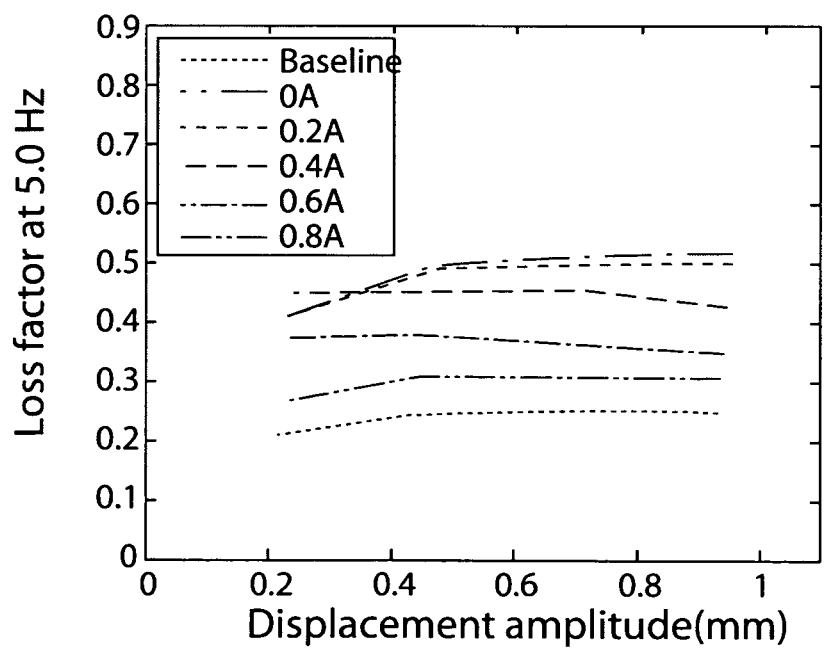
FIG. 16 is a graphical view of loss factor at lag/rev with respect to displacement amplitude at lag/rev demonstrated by a prototype concentric bearing type MRFE damper, wherein the applied current is varied from 0 to 0.8 Amp.

FIGS. 15 and 16 are graphs of the complex modulus and loss factor of the damper, respectively, at a single frequency (lag/rev). Compared with the baseline damper, the field-off MRFE damper provides similar inphase stiffness and quadrature stiffness. As the applied current increases, the index of the damping, i.e. the quadrature stiffness, increases dramatically. Comparatively, the inphase stiffness increases much less than the quadrature stiffness. Thus, the loss factor of the MRFE damper increases significantly over the entire amplitude range (0.5 vs. 0.3 between maximum field-on and field-off status). This increase in loss factor implies that the MRFE damper can provide a substantial damping control range (minimum 70% damping increase). Comparatively, the complex modulus of the MRFE damper demonstrates similar amplitude-dependent behavior to the baseline elastomeric damper, and the loss factor at each applied current is almost constant along the current amplitude range.

Figure 17:
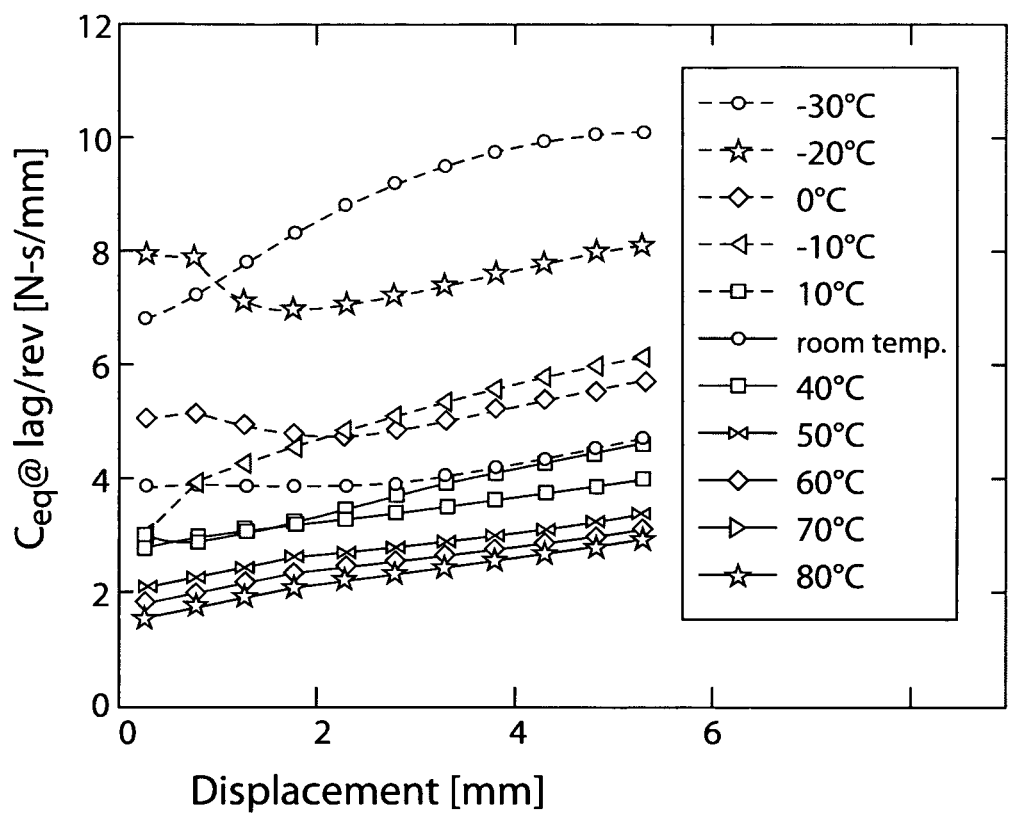
FIG. 17 is a graphical view of how temperature affects the equivalent damping with respect to displacement amplitude at lag/rev, as measured on a fluid elastic lag damper.

FIG. 17 is a graph illustrating the effect that operational temperature can have on a fluid-elastic damper, such as those in FIGS. 1-7, prior to replacing the standard hydraulic fluid with a magnetorheological fluid, hence making a retro-fit MRFE damper. Equivalent damping is shown here as a function of displacement amplitude at several temperatures, where it can be seen that the standard performance range varies substantially above and below the room temperature condition at cold and hot temperatures, respectively. By introducing the MR component 801 described herein, compensation for this large variation in damper properties can be at least partially accomplished, validating the utility of the invention in yet another manner.

It should now be apparent that the above-described embodiments provide adaptable damping for the helicopter lag mode using a combination of controllable magnetorheological (MR) fluids and reliable viscoelastic materials. This eliminates the detrimental effects of amplitude dependent damping loss at both very low amplitudes (below 0.5% strain) and high amplitudes (above 10% strain). Moreover, it allows adjustment of damping to augment stability and performance as a function of flight condition, or to mitigate temperature-dependent stiffening and softening at low and high temperatures, respectively. The MRFE damper technology has no (or few) moving parts offering increased reliability, and fail-safe, reduced power (or no power) operation. In addition, the foregoing is a retro-fit capable system that can be controlled and/or powered through the existing rotor de-icing slip ring. Potential applications extend beyond rotary wing vehicles to fixed-wing and unmanned air) vehicle applications.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A snubber magnetorheological fluid elastomeric (MRFE) damper system for use as a hingeless or bearingless helicopter rotor lead-lag damper, comprising:
   a) a flexible damper body defined by an internal cavity, said flexible damper body further comprising a flexible annular watt formed by a plurality of metallic rings separated by elastomeric material;
   b) an interior wall dividing said cavity, said interior wall having a port there through,
   c) magnetorheological (MR) fluid filled in the cavity of said flexible damper body; and
   d) a flow valve to control flow resistance of the MR fluid through the port of said interior wall.

2. A magnetorheological fluid etastomeric (MRFE) damper system comprising a flexible damper body defining an internal cavity, said flexible damper body further comprising a flexible annular wall formed by a plurality of metallic rings separated by elastomeric material.

3. The MRFE damper system according to claim 2, further comprising:
   a bottom plate attached to said flexible damper body;
   a middle plate attached to said flexible damper body; and
   a top plate attached to said flexible damper body;
   said internal cavity being enclosed by said flexible annular wall, said bottom plate, and said top plate.

4. The MRFE damper system according to claim 3, further comprising a pneumatic accumulator attached to the top plate.

5. The MRFE damper system according to claim 3, further comprising:
   a flexible interior wall dividing said cavity between said top plate and said bottom plate, said flexible interior wall subdividing the cavity into a first fluid chamber and a second fluid chamber.

6. The MRFE damper system according to claim 5, wherein the flexible interior wall comprises at least one flow port through the flexible interior wall from said first fluid chamber to said second fluid chamber.

7. The MRFE damper system according to claim 6, further comprising a flow mode MR valve in each flow port.

8. The MRFE damper system according to claim 7, wherein each flow mode MR valve comprises an electromagnetic valve having a bobbin wound by a coil, and a flux return guide.

9. The MRFE damper system according to claim 7, wherein each flow mode MR valve comprises a porous MR valve in each flow port.

10. The MRFE damper system according to claim 9, wherein each porous MR valve comprises a nonmagnetic tube, a coil wrapped around the tube, and porous media enclosed in the tube and forming fluid channels, whereby the MR fluid can only flow through the fluid channels existing in said porous media.

11. The MRFE damper system according to claim 2, further comprising an external flow port running external to said flexible damper body and in fluid communication with said cavity therein.

12. The MRFE damper system according to claim 5, further comprising an MR valve, and an external flow port running external to said flexible damper body and in fluid communication with said cavity therein, said external flow port connecting said first fluid chamber to said second fluid chamber through said top plate and by way of said MR valve.

13. The MRFE damper system according to claim 5, further comprising a rigid center post embedded centrally in said flexible interior wall, said interior wall comprising one of a rectangular or cruciform cross-section.

14. The MRFE damper system according to claim 13, further comprising a flow mode MR valve comprising an electromagnetic valve having a coil mounted at the center post of the interior wall.

15. The MRFE damper system according to claim 5, further comprising one of a pneumatic accumulator or air bladder attached to the top plate to pressurize the MR fluid in said cavity to compensate fluid volume change due to temperature variation and to prevent fluid cavitation.

16. The magnetorheological fluid elastomeric (MRFE) damper system according to claim 2, wherein said plurality of metallic rings are separated by a corresponding plurality of elastomeric material layers.

17. The MRFE damper system according to claim 2, wherein said plurality of metallic rings are embedded in an elastomer body.

* * * * *